United States Patent [19]

Ament et al.

[11] Patent Number: 5,618,077
[45] Date of Patent: Apr. 8, 1997

[54] ROLLER COVER FOR STATION WAGONS

[75] Inventors: Eduard Ament, Aichawald; Holger Seel, Aidlingen, both of Germany

[73] Assignee: Baumeister & Ostler GmbH & Co., Germany

[21] Appl. No.: 377,197

[22] Filed: Jan. 24, 1995

[30] Foreign Application Priority Data

Feb. 19, 1994 [DE] Germany .......................... 44 05 280.4

[51] Int. Cl.⁶ ..................................................... B60R 5/04
[52] U.S. Cl. ................................... 296/37.16; 160/121.1; 160/263
[58] Field of Search .............................. 296/37.16, 37.8; 160/120, 121.1, 263, 270

[56] References Cited

U.S. PATENT DOCUMENTS

| | | |
|---|---|---|
| 4,168,094 | 9/1979 | Keine . |
| 4,480,675 | 11/1984 | Berkemeier . |
| 4,668,001 | 5/1987 | Okumura et al. . |
| 5,224,748 | 7/1993 | Decker et al. .................. 296/37.16 |

FOREIGN PATENT DOCUMENTS

| | | |
|---|---|---|
| 2439105 | 5/1980 | France . |
| 3922450C2 | 5/1991 | Germany . |
| 4013157C1 | 7/1991 | Germany . |

Primary Examiner—Joseph D. Pape
Attorney, Agent, or Firm—Leydig, Voit & Mayer, Ltd.

[57] ABSTRACT

A roller cover for covering the baggage space of station wagons has an elongated housing in which the winding shaft of the cover is rotatably supported and which, in the driven-in state, receives a web for covering the space. The housing of the cover is provided with cup-shaped end caps which are spring-biased outwardly from the main body of the housing, so that the housing with the winding shaft centers itself in the auto body. For the locking of the cover in the vehicle, locking sliders are guided slidably in the end caps and are biased into locking positions by springs supported in the end cap so that the holding force of the locking members is independent of the auto body tolerances.

16 Claims, 6 Drawing Sheets

ROLLER COVER FOR STATION WAGONS

BACKGROUND OF THE INVENTION

From DE-PS 3922450, there is known a roller cover for station wagons. This cover has an elongated rigid housing, in which a winding shaft is rotatably supported. To the winding shaft, a roll-up web is fastened with one edge, which web leads to the outside through an outlet or slot in the elongated housing. A spring motor cooperating with the winding shaft tends to constantly wind up-the web onto the winding shaft.

In the rigid end pieces of the housing, there is supported a locking slider which is biased by means of a spring into a locking position thrust forwardly out of the housing and which can be pressed back into the housing of the roller cover with the aid of an actuating knob.

The known roller cover is removable from the loading space of the station wagon, which loading space contains, for the fastening of the roller cover, corresponding pockets behind the back of the rear seat and underneath the rear side windows, into which the roller cover is installable from above. In the installed position, the sliders of the locking arrangement engage into corresponding small recesses in the pockets and thus ensure against undesired upward jumping out of the roller cover.

Because of the rigid end pieces, in the known roller cover, there occurs virtually no automatic centering capable of balancing lateral tolerances in the automobile body. Rather, because of the tolerances, the housing is shifted to one side, so that with the roller web drawn out, gaps created between the roller web and the body parts are of different size to the left and to the right. Since gaps as narrow as possible are sought, a deviation in width of the gaps is especially conspicuous.

U.S. Pat. No. 4,480,675 discloses a roller cover for the loading spaces of passenger cars, the cover having no outer housing. The roller web is connected about in the middle with the winding shaft so that, when the winding shaft is rotated by the spring motor, both ends of the roller web move simultaneously onto the winding shaft. In order to absorb the reaction moment of the spring motor, the winding shaft is gripped on its ends by cup-shaped caps, which are guided with extensions in corresponding guide rails of the automobile. In order to remove the roller cover from the guide rails or to make it possible to balance width tolerances, the caps are axially sprung with respect to the winding shaft and can be moved toward one another against the action of the spring, in order to make it possible for the roller to hang out from the guide rails.

The lift for the face-side caps must be so great there that it suffices to make the roller hang out when clearance measures of the auto body lie at the lower tolerance limit. Accordingly, the slots for the roller web in the caps are relatively very long. Furthermore, the possible width of-the roller web is naturally narrowed, since, to the required lift because of the tolerance, there is further added the lift for the hanging-out. The gap width between the drawn-out roller web and the adjacent auto body parts is, therefore, undesirably great.

SUMMARY OF THE INVENTION

The general aim of the present invention is to create a self-centering roller cover which makes possible an extremely small lateral gap between the roller web and the auto body when the roller web is drawn out.

In the roller cover of the invention, end pieces are provided on the housing, which end pieces are supported with respect to the housing, on the one hand movably and on the other hand by means of spring arrangements so that the part of the housing containing the winding shaft centers itself automatically in the installed position inside the loading space. In addition, a relatively wide roller web can be used because the width of the roller web need not be dimensioned in such a way that simultaneously there is given the movement freedom of the end pieces necessary for the hanging-out of the roller. Instead, a snapping in and out or the fixing of the housing of the roller cover occurs with the aid of the separately movable locking members which are seated in the end pieces and, therefore, can always be brought into an optimal position.

In order to avoid damage to the edges of the roller web, stops are allocated to the two end positions for the end pieces. As a result, there is avoided an unnecessarily far pressing-out of the end pieces with the consequence of a difficult handling during installation and, as stated, edge damage is precluded.

For purposes of saving space and creating an attractive appearance, the end pieces preferably are in the form of cup-shaped caps which grip over the intermediate piece of the housing from outside the housing.

A good spring suspension of the end pieces, which also does not impair the rotation of the winding shaft and its bearing, is achieved if the spring arrangements for the end pieces are supported in the intermediate piece of the housing while, on the other hand, the spring arrangements for the locking members are supported in the end pieces.

If the movement direction of the locking members is in a direction parallel to the winding shaft, the force provided from the spring arrangement for the end pieces is greater than the force provided by the spring arrangement for the locking members, so that the end pieces always fit in the corresponding pockets in the motor vehicle.

In another embodiment, the locking members are movable transversely to the longitudinal axis of the winding shaft. In this embodiment, the locking members are expediently formed by levers which are turnable about a pivot axis parallel to the winding shaft.

These and other objects and advantages of the invention will become more apparent from the following detailed description when taken in conjunction with the accompanying drawings.

Figure 1:
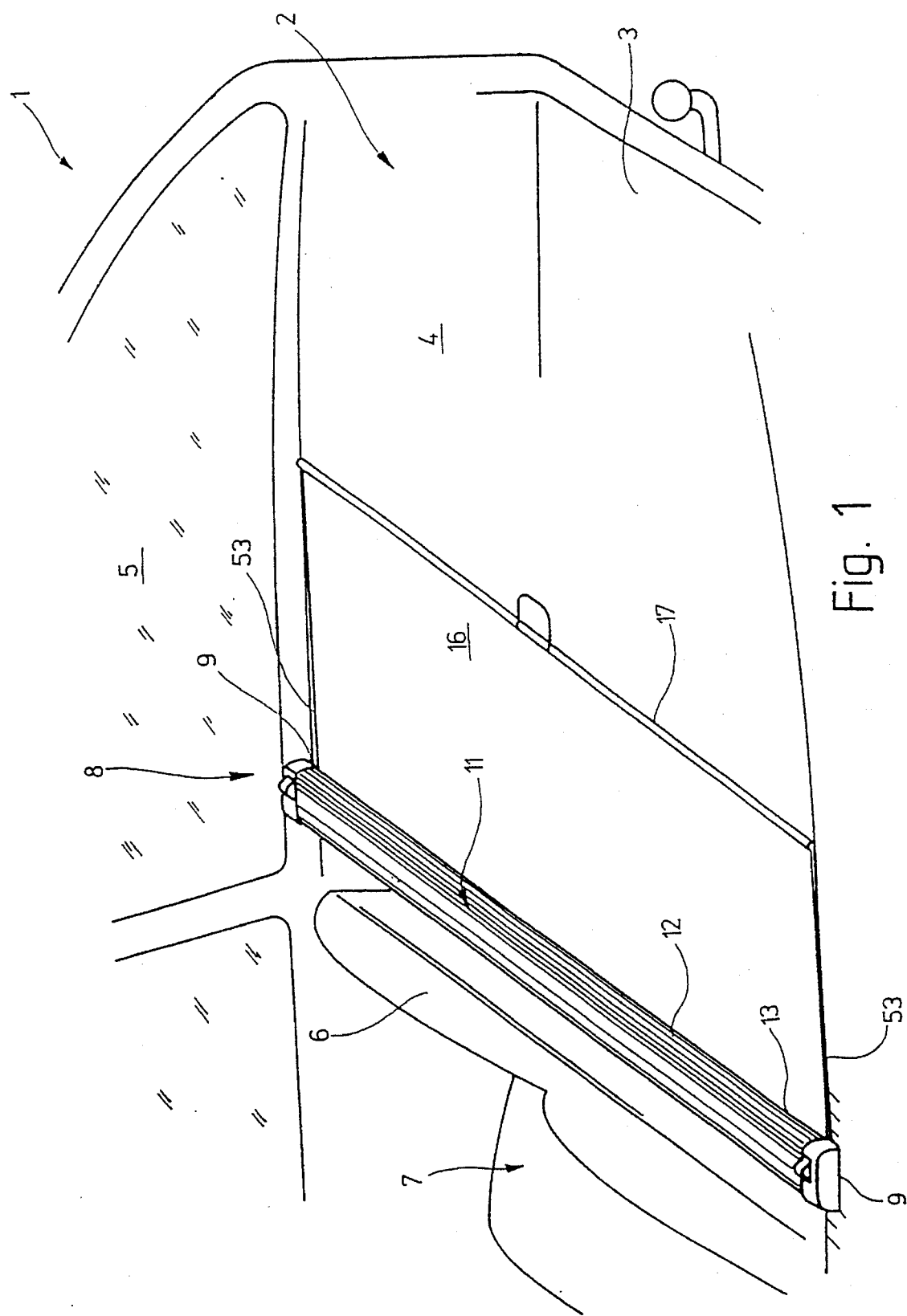
FIG. 1 is a perspective view showing a roller cover according to the invention in the baggage space of a motor vehicle.

While the invention is susceptible of various modifications and alternative constructions, certain illustrated embodiments hereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENTS

In FIG. 1, there is shown a portion of a station wagon or passenger car having a loading space 2 bounded by a floor 3 as well as two side walls, only the right-hand side wall 4 having been shown. Above the side wall 4, there is a rear side window 5 while the front of the loading space 2 is closed off by a rear seat rest 6 of a rear seat 7.

To cover the loading space 2, there is provided a roller cover 8 which is located just underneath the lower edge of the side window 5 and about at the level of the upper edge of the rear seat rest 6. The roller cover 8 is inserted in two receiving pockets 9 aligned with one another, the pockets being located underneath the side windows 5 and in the side walls just behind the back seat back 6. The receiving pockets 9 define recesses which open toward one another. The roller cover 8 has an elongated housing 11 which is approximately square in cross section and which is provided with a slot 13 on its side surface 12 facing away from the back seat rest, the slot extending virtually over the entire length of the housing 11. In the interior of the housing 11, there is rotatably supported a winding shaft 14 (FIG. 2) which is biased in one direction by a winding spring (not shown) that serves as a spring motor. One end of the winding spring is connected with the winding shaft 14 while the other end of the spring is connected with the housing 11. The spring imparts torque to the winding shaft 14 in the driving-in direction of a web 16, which is fastened with one edge to the winding shaft 14. The web 16 runs through the slot 13 and carries on its other edge, parallel to the winding shaft 14, a pull rod 17 for the operation of the cover 8 when the web 16, which is illustrated partly pulled out in FIG. 1, is completely driven out in order to cover the baggage trunk or loading space at the top.

Figure 2:
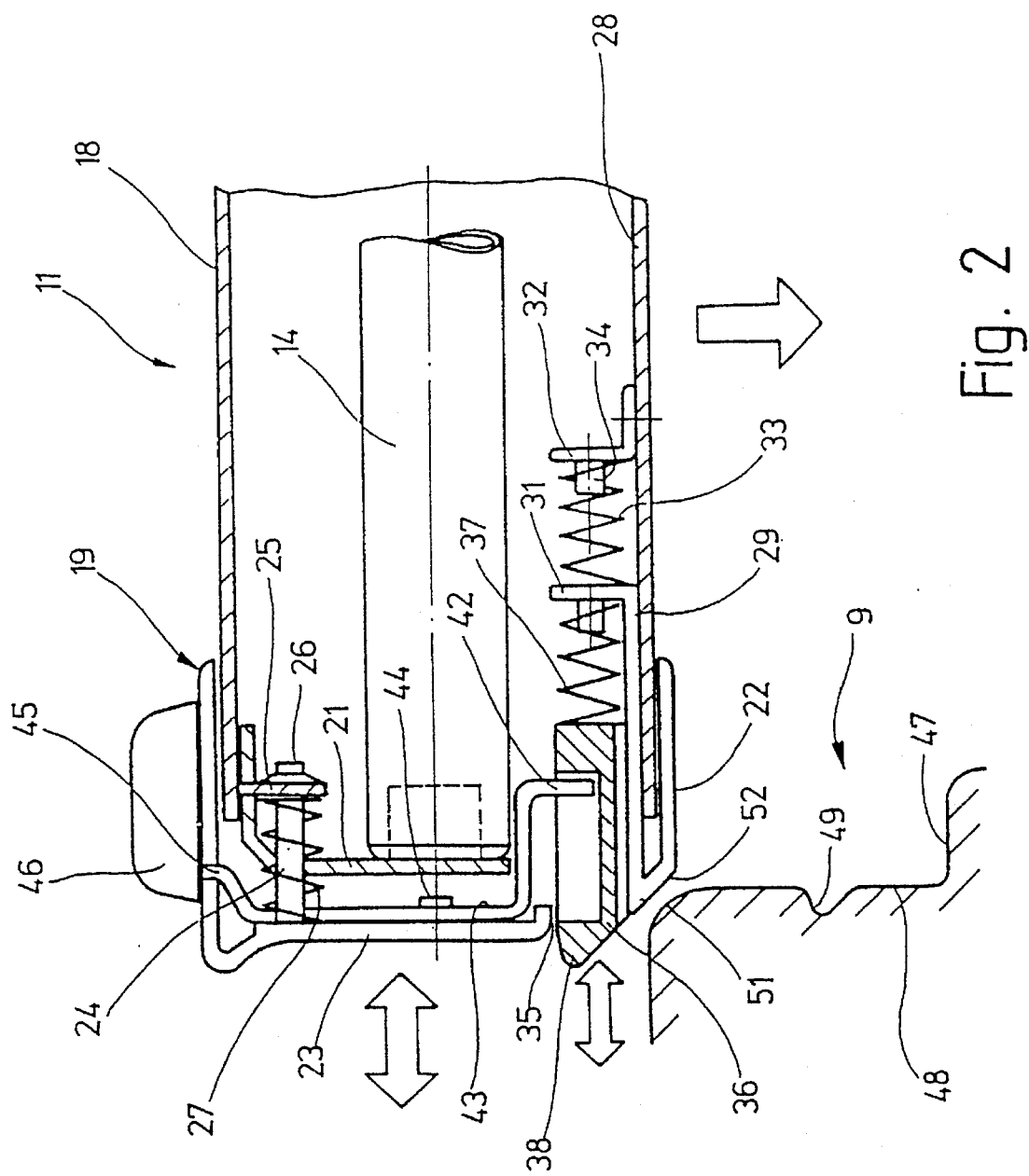
FIG. 2 is a fragmentary longitudinal cross-sectional view of the housing of the roller cover and shows the cover before the latter is installed in the receiving pockets of the motor vehicle.

As the longitudinal section according to FIG. 2 shows, the housing 11 consists of an elongated, tubular intermediate piece 18 of continuous, substantially constant and approximately rectangular cross-section as well as two end pieces 19 of cup-shaped form arranged at the two ends of the intermediate piece. In FIG. 2, for simplicity of illustration, only one of the two end caps 19 is shown. The other end cap 19 is a mirror image, so that the description given for the illustrated end cap is also applicable to the other end cap 19.

Fastened to the inner side of the tubular intermediate piece 18 near the ends thereof are two downward extending fishplates 21, which serve as rotatable bearings for the winding shaft 14 and simultaneously absorb the reaction moment of the winding spring (not shown). The torque is transferred over the twistproof connection of the end caps 19 with the intermediate piece 18 onto the end caps 19.

The end cap 19 consists of an outer collar 22 fitted to the cross section of the intermediate piece 18, which collar goes over in one piece into a side wall 23 closing off the housing 11 to the outside. With the collar 22, the end cap 19 grips over the intermediate piece 18 from outside, and the collar contains a slot aligning with the slot 13. Because of the type of illustration, the slot in the collar is not visible.

On the inside of the wall 23 there is mounted a cylindrical pin 24, which runs parallel to the axis of the winding shaft 14 and which extends into the intermediate piece 18. The pin 24 cooperates with a fishplate 25 which is fastened near the end of the intermediate piece 18 and which contains a passage bore through which the cylindrical pin 24 extends. The end of the pin 24 that extends through the fishplate 25 carries a securing spring 26, which after assembly, prevents the cylindrical pin 24 from being drawn out from the fishplate 25.

By means of a coil spring 27 arranged on the pin 24, the end cap 19 is biased outwardly or in the direction away from the intermediate piece 18 into an outer position until the securing spring 26 comes into engagement with the back of the fishplate 25.

The intermediate piece 18 of-the casing 11 has a substantially flat bottom 28, over which there slides a fishplate 29 molded to the collar 22. On its end lying in the intermediate piece 18, the fishplate 29 terminates in an upwardly projecting fishplate 31. Between the fishplate 31 and a further stop plate 32 spaced inwardly from the fishplate 31, there extends a further pressure spring 33, which acts in the same direction as the pressure spring 27 and likewise tends to thrust the end cap 19 into the outer position. A cylindrical bolt 34 retains the pressure spring 33 on the fishplate 32.

By virtue of this arrangement, the end cap 19 is slidable back and forth between two end positions. One position is shown in FIG. 2 and, in this position, the securing spring 26 rests on the fishplate 25. The other end position is reached by pressing the end cap 19 toward the intermediate piece 18 until, for example, the inside of the wall 23 engages the bearing plate 21.

Above the fishplate 29 and bounding directly on this, the wall 23 of the cap 19 has a rectangular opening 35, in which there is guided a slab-form or block-form locking member in the form of a longitudinally slidable pusher 36. The guide arrangements (not further illustrated) for the locking pusher or slider 36 guide the slider in a direction parallel to the longitudinal axis of the winding shaft 14. By means of a further helical pressure spring 37 which bears on the inner rear side of the locking slider 36 and which abuts against the fishplate 31 that is fixed with respect to the cap 19, the locking slider is biased into its outer position, from which it projects with its V-shaped pointed locking extension or lug 38 extending outwardly beyond the cap 19.

Figure 3:
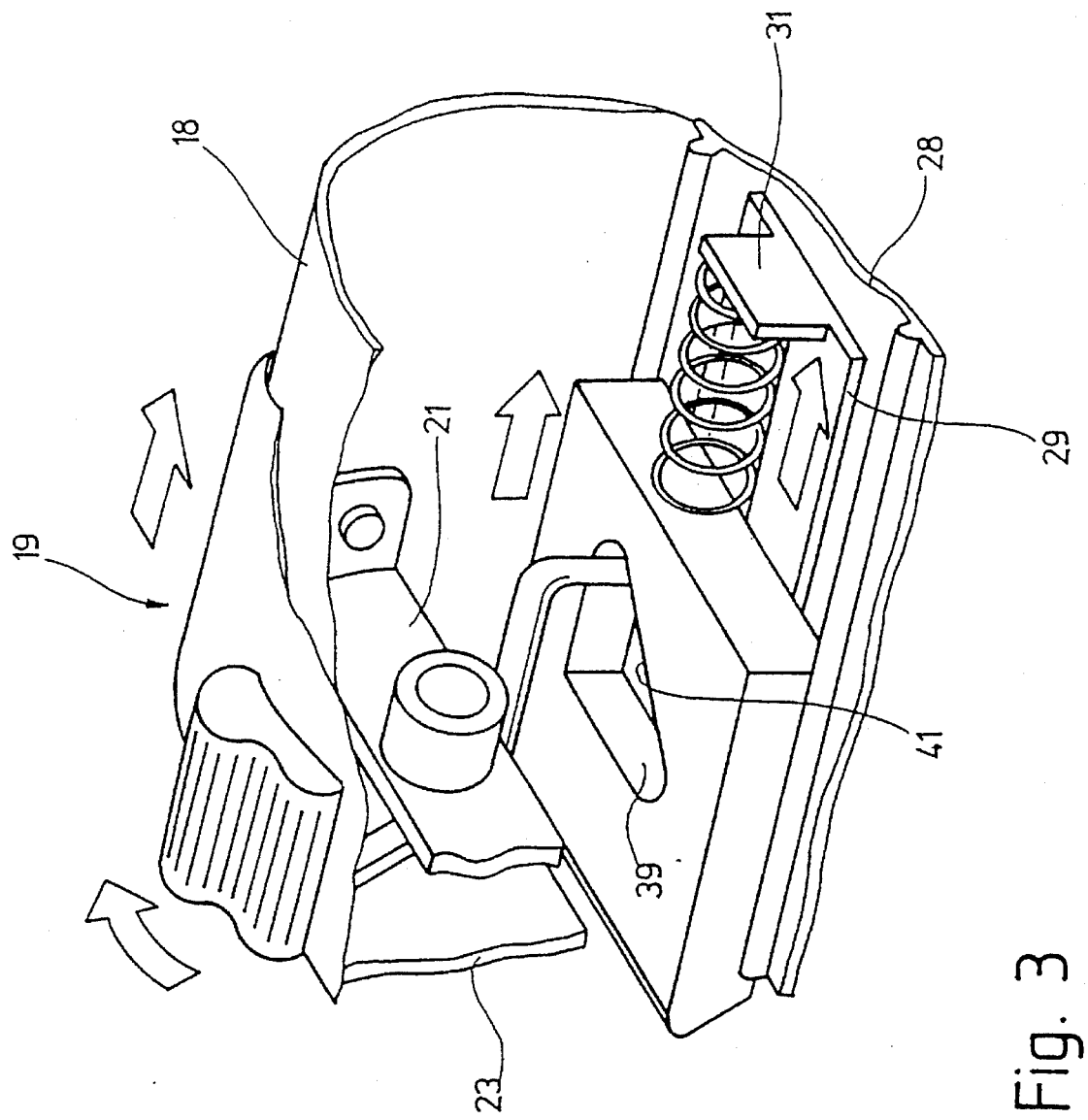
FIG. 3 is a fragmentary perspective view of the end portion of the housing shown in FIG. 2.

In order to move the locking slider 36 back against the action of the pressure spring 37 and into the end cap 19, there is provided, in the locking slider 36, an opening 39 forming a coulisse with a cross section corresponding to a right triangle. The opening includes a straight surface 41 running obliquely to the direction of movement of the locking slider 36, the surface 41 being located on the end of the opening 39 which lies away from the locking extension 38 (see FIG. 3). Into this opening 39 there engages an end 42 of a two-armed lever 43 which is pivotally supported on the inside of the wall 23 on a pivot pin 44. The lever end 45 lying opposite the lever end 42 with respect to the pivot pin 44 projects upwardly through a slot in the upper side of the collar 22 of the end cap 19 and carries an operating knob 46.

The pivot pin 44 is arranged so that the lever 43 is swingable back and forth about an axis parallel to the winding shaft 14. As the lever swings back and forth, it moves along-the oblique surface 41.

The previously mentioned pockets 9 which are provided laterally in the auto body are bounded on the underside by a floor surface 47 which is constructed complementarily to the underside of the end cap 19. Laterally, the receiving pockets 9 are bounded by a substantially vertically running straight side wall 48, in which there is formed a small rest recess 49. Finally, in order to facilitate the introducing of the roller cover 8 into the pockets 9, each side wall 48 is beveled on its upper edge 51.

The handling of the roller cover 8 described thus far is as follows. Let it first be assumed that the roller cover 8 is not installed in the passenger car. In this state, the winding spring has caused the web 16 to be completely wound up on the winding shaft 14. Winding-up of the web is limited by virtue of the pull rod 17 engaging the edges of the cloth slot 13 so as to prevent a complete drawing-in of the web 16.

Since no lateral forces are acting on the housing 11, the two end caps 19, in consequence of the action of the pressure springs 27 and 33, are in the outer end position.

The roller cover 8 can, in this position, be installed from above into the two receiving pockets 9, the cross section of which corresponds approximately to the cross section of the end caps 19. Here, a beveled surface 52 of the end cap in the transition zone between the side wall 23 and the collar 22 slides along the beveled surface 51 of the pocket 9 whereby the two end caps 19 are slid axially further onto the intermediate piece 18 against the action of the pressure springs 27 and 33. Accordingly, it is possible to slide the housing 11 at both ends from above into the pockets 9. Simultaneously, the locking slider 36 engages the beveled surface 51 and is thrust inwardly into the end cap 19, without need of actuating the operating knobs 46, because the locking sliders can yield freely in the inward direction. It is sufficient to let a corresponding force act from above on the housing 11.

Shortly before the housing 11 comes into position on the supporting surface 47 in the pocket 9, the pointed locking extension 38 snaps into the locking recesses 49 and, by reason of correspondingly obliquely lying surfaces, hold the end caps 19 completely and without clattering against the floor surface 47.

Thus the roller cover 8 is completely installed and, according to need, the web 16 can be drawn out of the housing in order to cover the baggage in the baggage space 2.

Since there are approximately equal biasing forces on both sides between the intermediate piece 18 and the end caps 19, the intermediate piece 18 is centered very accurately between the two end caps 19. Consequently, the winding shaft 14 which is supported in the intermediate piece 18 is centered. When the web 16 is drawn out, the gaps on both sides of the web as indicated at 53 in FIG. 1, are of equal width.

Also, since the actuating force by the pressure springs 27 and 33 is greater than the force which the pressure spring 37 is capable of exerting, the end caps 19 are located with their walls 23 bearing snugly on the side walls 48 of the pockets 9.

To remove the roller cover from the passenger car, the actuating knobs 46 on both sides of the housing 11 are thrust to the rear so as to swing the two-armed levers 43 connected to the knobs. The end 42 of each lever slides along the oblique surface 41 and thereby shifts the locking slider 36 inwardly relative to the associated end cap 19. The housing 11 thus may be removed upwardly from the pockets 9.

By reason of the described arrangement, the force required for actuating the locking slider 36 is not increased by the fact that, for the centering of the roller cover 8, a spring force is necessary between the receiving pockets 9, and, indeed, regardless of how great this last-mentioned force might be.

Figure 4:
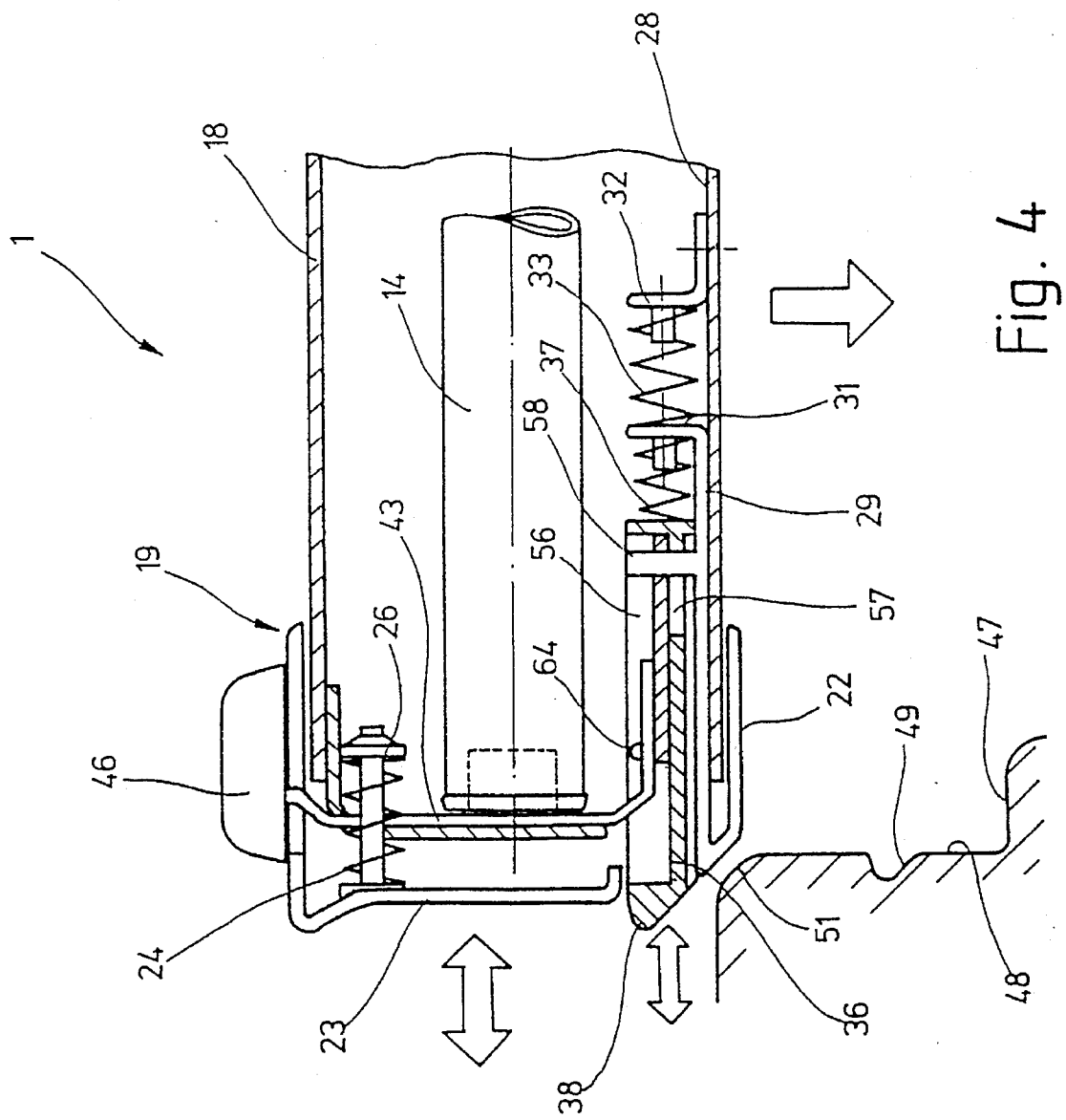
FIGS. 4 and 5 are views similar to FIGS. 2 and 3, respectively, but show another embodiment of the invention.
Figure 5:
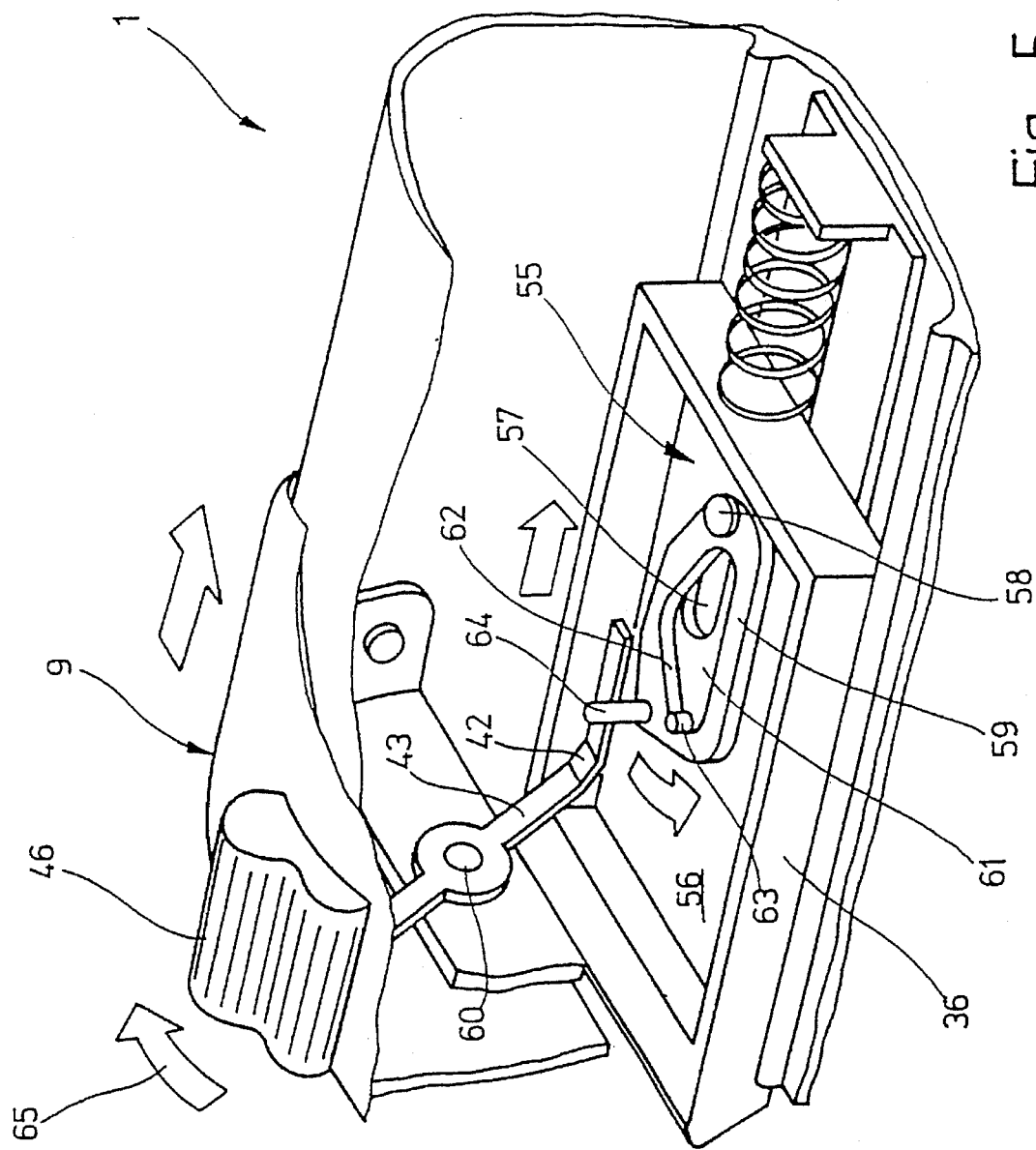

In FIGS. 4 and 5 there is illustrated a roller cover 1 that differs from the previous embodiment essentially only by a change of the coulisse mechanics for the actuation of the slider 36. Parts in FIGS. 4 and 5, corresponding to those of the first embodiment are not described again and are provided with the same reference numbers.

The slider 36 contains in its upper side a pocket-shaped recess 55 with a substantially flat bottom 56. In the bottom 56 there is contained an oblong hole 57 through which extends a bearing pin 58 extending upwardly from the fishplate 29. The oblong hole 57 extends parallel to the direction of movement of the slider 36.

On the bearing pin 58 there is swingably seated a coulisse plate 59 formed with an opening 61 which is approximately triangular in plan view. A wall of the opening 61 forms an oblique surface 62 which runs obliquely to the direction of movement of the slider 36. With the oblique surface 62 there cooperates a pin 63 which extends upwardly from the bottom 56.

A further pin 64 is carried on the coulisse plate 59 and is located remotely from the pin 58 forming the pivot axis. Cooperating with the pin 64 is the bent end 42 of the lever 43 which, in this embodiment, is supported by a bearing pin 60 of the winding shaft 14 instead of on a pin of its own.

The installing of the roller cover 1 according to FIGS. 4 and 5 takes place in the same manner as has already been described. In the installing, the end caps 19 slide inwardly onto the intermediate piece 18 and the locking sliders 36 move with their projecting extensions 38 disappearing into the end caps 19. In this movement of each locking slider 36, the pin 58 runs through the oblong hole 57. On reaching the rest recess 49, the locking slider 36 is thrust forwardly by the spring 33 into the rest recess 49 and the cover 1 is held fast, secure against rattling, in the passenger car.

For the removing of the cover 1, the actuating knob 46 is pushed to the rear as is indicated by an arrow 65 with respect to the drawing plane of FIG. 5. This movement leads to a swinging of the coulisse plate 59 counterclockwise with respect to the pin 58, since the end 42 of the lever 43 pushes the pin 64 forward toward the viewer. In consequence of this swinging movement, the pin 63 which is secured rigidly to the locking slider 36 runs along the oblique surface 62 which leads to the result that the pin 58 and the pin 63 approach one another. Since one of the two pins is rigidly joined with the locking slider 36, the locking slider 36 is retracted so that its locking extension 38 can be released from the rest recess 49, in order to remove the cover 1 upwardly out of the pockets 9.

Figure 6:
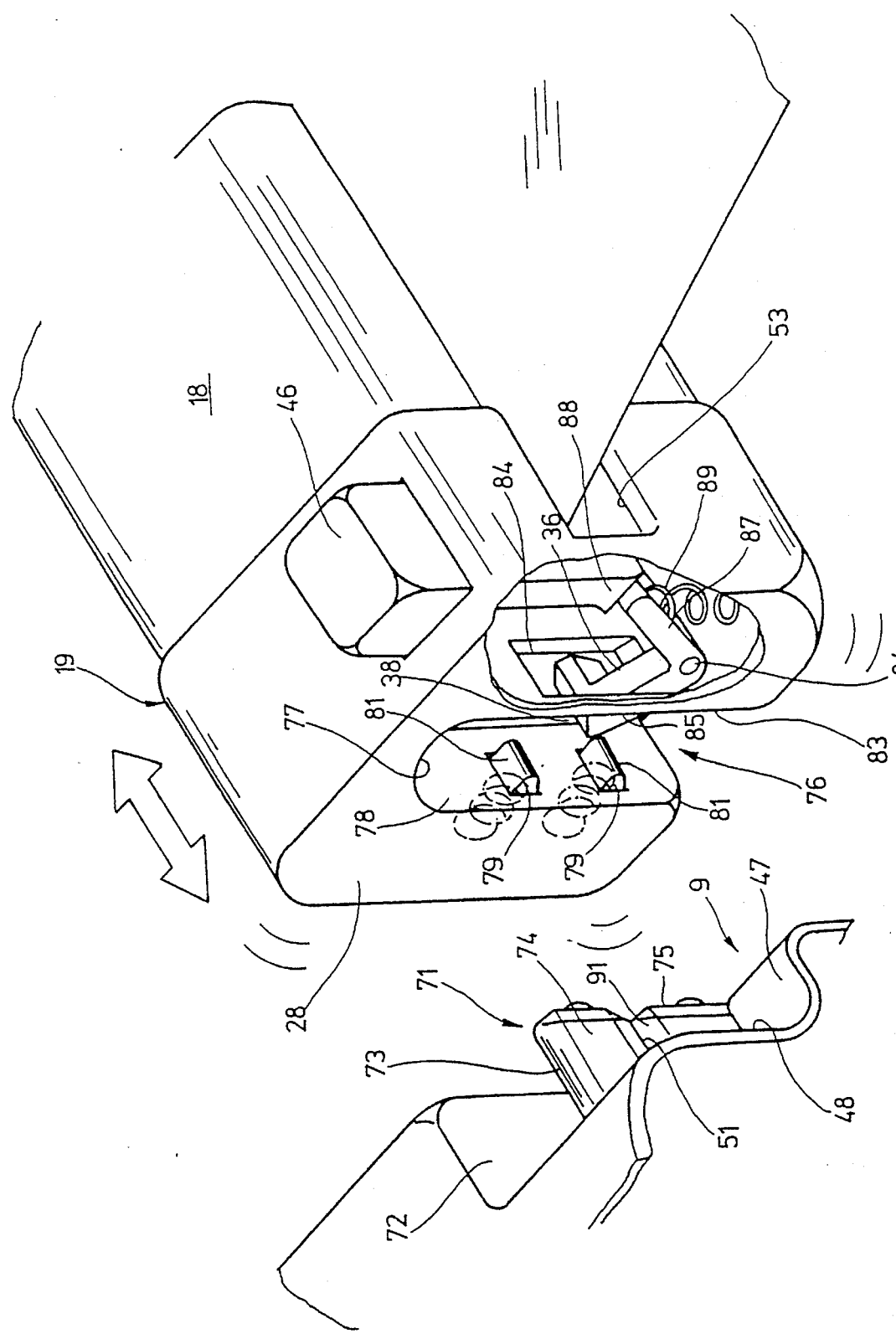
FIG. 6 is a fragmentary perspective view of still another embodiment of the invention.

FIG. 6 shows an embodiment of the cover 1, in which the mounting and fixing takes place not in a pocket 9, but rather on a rib 71. Parts already described or functionally corresponding to one another are provided in FIG. 6 with the reference numbers from the preceding figures.

In the form of execution according to FIG. 6, the receiving pocket 9 includes only a bottom surface 47 that runs substantially perpendicularly to the axis of the winding shaft 14 as well as a back wall 72. At a corresponding distance from the back wall 72, there projects from the side wall 48 the rib 71 which proceeds from the support surface 47 and terminates just above the upper edge of the receiving pocket 9 in the form of an edge 73. The rib 71 is defined essentially by two surfaces 74 approximately parallel to the axis of the winding shaft 11 as well as a surface 75 which is aligned about at a right angle to the longitudinal axis of the winding shaft 14. Only one of the surfaces 74 is visible in FIG. 6.

The end cap 19 contains in the side wall 28 an approximately pocket-shaped groove 76, complementary to the rib 71, and extending into the end cap 19. The groove is closed off on its upper end by a face wall 77.

Two slidably guided contact-pressure members 81 extend into the groove 76 through two openings 79 formed in a rear side wall 78 of the groove.

A front side wall 83 of the groove 76 is formed with a further rectangular opening 84, in which there is swingably supported a locking member which herein is in the form of a two-armed lever 36. The lever 36 is an angle lever and is placed on a fixed pivot pin 84 in the cap 19, the pin extending parallel to the longitudinal axis of the winding shaft 14. A shank 85 of the lever 36 extends through the opening 84 and carries a rest lug 38, while another shank 87 is inclined upwardly at about 45° and cooperates at its free end with a downwardly projecting extension 88 of the actuating knob 46. By means of a coil spring 89, the lever 36 is biased into a position in which its rest lug 85 extends through the opening 84 into the groove 76.

The installation of the cover 1 of FIG. 6 takes place as in the previous embodiments, the distance between the side walls 48 of the receiving pockets 9 being somewhat less than the spacing of the side walls 28 when the two end caps 19 are in their end positions somewhat thrust outward. As a result of the rounded surfaces 51, pressing of the cover 1 downwardly into the receiving pockets 9 causes the end caps 19 to be pushed back somewhat so that their spacing corresponds to the distance between the side surfaces 48. In the process, each rib 71 simultaneously moves into the associated groove 76. Here, on the one hand, the rest extensions 38 as well as, on the other hand, the contact pressure members 81 are pressed back correspondingly from the groove 76. Toward the end of the installing movement, the upper edge 73 of the rib 71 abuts the face wall 77 and simultaneously the rest lug 38 snaps into an oppositely lying rest recess 91 of the rib 71.

For the removing of the cover 1, the actuating knob 46 is depressed whereby the lever 36 is swung clockwise about its bearing pin 84. By virtue thereof, the rest lug 38 comes free from the rest recess 91 and the cover 1 can be removed in upward direction.

Since the cover 1 is the same at both ends, it is obvious that a corresponding actuation is required also of the push knob 46 at the other end.

As in the previous embodiments, the movability of the end caps 19 in connection with the corresponding spring members permits an automatic centering of the intermediate piece 18 of the casing 11, so that the web is centered in the opening of the trunk space. Furthermore, there is achieved a rattle-free support, because the two contact-pressure members 81 bias the groove 76 and the rib 71 against one another so that the rib 71 comes to lie with its front side surface 74 on the front surface 83 of the groove 76.

We claim:

1. A roller cover (1) for covering the loading space (2) of passenger cars, said cover comprising, an elongated housing (11) adapted to be inserted into and removed from the loading space (2), said housing including an intermediate piece (18) having a slot (13) and including two end pieces (19) seated on the intermediate piece (18), a winding shaft (14) rotatably supported in the housing (11), a web (16) fastened to the winding shaft (14) and adapted to be drawn out of the housing (11) through the slot (13), a drive device located in the housing (11) and coupled to the winding shaft (14) to rotate the shaft in a direction retracting the web into the housing, locking members (36) movably supported in said end pieces (19) and biased toward locking positions by first spring means (37, 89), each locking member having at least one locking extension (38) which protrudes outwardly when the locking member is in said locking position, the two end pieces (19) being longitudinally slidable with respect to the intermediate piece (18) of the housing (11) in a direction parallel to the longitudinal axis of the winding shaft (14), and second spring means (27, 33) biasing said end pieces to outer positions away from said intermediate piece (18), said end pieces being movable to inner positions against the action of said second spring means (27, 33).

2. A roller cover according to claim 1, characterized in that to the outer and inner positions there are allocated stops (23, 26).

3. A roller cover according to claim 1, characterized in that the end pieces (19) are substantially mirror-image symmetrical.

4. A roller cover according to claim 1, characterized in that the end pieces (19) are cup-type caps which grip outward over the intermediate piece (18).

5. A roller cover according to claim 1, characterized in that the first spring means (37, 89) for the locking members (36) are supported in the end pieces (19).

6. A roller cover according to claim 1, characterized in that the second spring means (27, 33) for the end pieces (19) in the outer positions of the end pieces (19) bring up a greater force than the first spring means for the maximally driven-out locking members (36).

7. A roller cover according to claim 1 characterized in that the intermediate piece (18) has bearing arrangements (21) for the winding shaft (14).

8. A roller cover according to claim 1 characterized in that the locking members (36) are locking slides which are longitudinally slidable in the appropriate end piece (19).

9. A roller cover according to claim 1, characterized in that the locking members (36) are levers which are swingably supported in the respective end piece.

10. A roller cover according to claim 1, characterized in that the direction of movement of the locking members (36) lies parallel to the longitudinal axis of the winding shaft (14).

11. A roller cover according to claim 1, characterized in that the direction of movement of the locking members (36) lies at a right angle to the longitudinal axis of the winding shaft (14).

12. A roller cover according to claim 1, characterized in that an actuating arrangement (39, 43, 46, 42, 59) is provided for the actuation of each locking member (36).

13. A roller cover according to claim 12, characterized in that the actuating arrangement (39, 43, 46, 42, 59) comprises an actuating lever (43) supported in the end piece (19), said lever having an actuating knob (46) located outside the housing (11).

14. A roller cover according to claim 12, characterized in that the actuating arrangement (39, 43, 46, 42, 59) has a coulisse (41, 59).

15. A roller cover according to claim 14, characterized in that the coulisse (39) is formed by a surface (41) of an opening (39) contained in the locking member (36), and that the surface (41) lies obliquely to the direction of movement of the locking member (36).

16. A roller cover according to claim 1, characterized in that the coulisse (39) is formed by a lever (59) swingably supported in the associated end piece (19), the lever (59) having an opening (61) with an oblique surface (62) which lies obliquely to the direction of movement of the locking member (36), that on the locking member (36) there is seated a pin (63) extending through the opening (61) and that an actuating knob (46) cooperates with the lever (59).

* * * * *